United States Patent
Kress et al.

(10) Patent No.: US 9,671,612 B2
(45) Date of Patent: Jun. 6, 2017

(54) DYNAMIC LENS FOR HEAD MOUNTED DISPLAY

(71) Applicant: Google Inc., Mountain View, CA (US)

(72) Inventors: Bernard C. Kress, Redwood City, CA (US); Greg E. Priest-Dorman, Berkeley, CA (US)

(73) Assignee: Google Inc., Mountain View, CA (US)

( * ) Notice: Subject to any disclaimer, the term of this patent is extended or adjusted under 35 U.S.C. 154(b) by 28 days.

(21) Appl. No.: 14/167,851

(22) Filed: Jan. 29, 2014

(65) Prior Publication Data

US 2015/0212326 A1 Jul. 30, 2015

(51) Int. Cl.
G02B 27/01 (2006.01)
G02B 3/14 (2006.01)
G02B 26/08 (2006.01)

(52) U.S. Cl.
CPC .......... *G02B 27/0172* (2013.01); *G02B 3/14* (2013.01); *G02B 26/0808* (2013.01); *G02B 2027/0123* (2013.01); *G02B 2027/0127* (2013.01); *G02B 2027/0178* (2013.01); *G02B 2027/0185* (2013.01)

(58) Field of Classification Search
CPC .................................................. G02B 27/0179
See application file for complete search history.

(56) References Cited

U.S. PATENT DOCUMENTS

| | | | |
|---|---|---|---|
| 5,579,164 A | 11/1996 | Chapnik | |
| 6,330,118 B1 | 12/2001 | Daschner et al. | |
| 6,867,888 B2 | 3/2005 | Sutherland et al. | |
| 9,057,826 B2 | 6/2015 | Gupta et al. | |
| 2004/0164927 A1 | 8/2004 | Suyama et al. | |
| 2006/0023065 A1 | 2/2006 | Alden | |
| 2007/0052876 A1* | 3/2007 | Kaufman | G02B 3/14 349/13 |
| 2007/0195409 A1 | 8/2007 | Yun et al. | |
| 2008/0117289 A1 | 5/2008 | Schowengerdt et al. | |
| 2009/0174918 A1 | 7/2009 | Zhuang et al. | |
| 2009/0189974 A1 | 7/2009 | Deering | |
| 2011/0007277 A1* | 1/2011 | Solomon | G02B 26/105 353/7 |
| 2011/0018903 A1 | 1/2011 | Lapstun et al. | |
| 2012/0021848 A1 | 1/2012 | Watson et al. | |
| 2012/0032872 A1* | 2/2012 | Kuhlman | G02B 5/045 345/1.1 |
| 2012/0081800 A1 | 4/2012 | Cheng et al. | |
| 2012/0249797 A1* | 10/2012 | Haddick | G06F 1/163 348/158 |

(Continued)

FOREIGN PATENT DOCUMENTS

KR 10-1143558 B1 6/2012

OTHER PUBLICATIONS

PCT/US2015/010507; PCT International Search Report & Written Opinion, mailed Apr. 15, 2015, 11 pages.

(Continued)

*Primary Examiner* — Paisley L Arendt
*Assistant Examiner* — Edmond Lau
(74) *Attorney, Agent, or Firm* — Blakely Sokoloff Taylor & Zafman LLP

(57) ABSTRACT

A Head Mounted Display ("HMD") includes a display module, an optical combiner, control circuitry, and a lens. The display module generates image light and the optical combiner is for combining the image light with external scene light. The lens is positioned to receive the image light. The lens is capable of dynamically changing at least one lens property of the lens. The control circuitry controls the lens to dynamically change at least one lens property of the lens.

10 Claims, 14 Drawing Sheets

(56) References Cited

U.S. PATENT DOCUMENTS

| | | | |
|---|---|---|---|
| 2013/0033756 A1 | 2/2013 | Spitzer et al. | |
| 2013/0141311 A1 | 6/2013 | Ho et al. | |
| 2013/0222384 A1 | 8/2013 | Futterer | |
| 2013/0286047 A1* | 10/2013 | Katano | G02B 27/0101 345/633 |
| 2013/0314793 A1 | 11/2013 | Robbins et al. | |
| 2013/0342571 A1* | 12/2013 | Kinnebrew | G06F 3/147 345/633 |
| 2014/0002626 A1* | 1/2014 | Yu | A61B 1/0019 348/66 |

OTHER PUBLICATIONS

Zheng, Z. et al., "Design and fabrication of an off-axis see-through head-mounted display with an x-y polynomial surface," Applied Optics, vol. 49, Issue 19, pp. 3661-3668 (2010), Optical Society of America. http://dx.doi.org/10.1364/AO.49.003661.

Kress, B. C. et al., "Applied Digital Optics: From Micro-Optics to Nanophotonics," Chapter 10: Digital Nano-optics, Oct. 2009, pp. 253-293, John Wiley & Sons, Ltd, Chichester, UK. ISBN: 978-0-470-02263-4.

Kress, B. C. et al., "Applied Digital Optics: From Micro-Optics to Nanophotonics," Chapter 12: Digital Optics Fabrication Techniques, Oct. 2009, pp. 339-411, John Wiley & Sons, Ltd, Chichester, UK. ISBN: 978-0-470-02263-4.

Kress, B. C. et al., "Applied Digital Optics: From Micro-Optics to Nanophotonics," Chapter 13: Design for Manufacturing, Oct. 2009, pp. 413-452, John Wiley & Sons, Ltd, Chichester, UK. ISBN: 978-0-470-02263-4.

Kress, B. C. et al., "Applied Digital Optics: From Micro-Optics to Nanophotonics," Chapter 14: Replication Techniques for Digital Optics, pp. 453-478, Oct. 2009, John Wiley & Sons, Ltd, Chichester, UK. ISBN: 978-0-470-02263-4.

U.S. Appl. No. 14/144,207, filed Dec. 30, 2013, Kress et al.

* cited by examiner

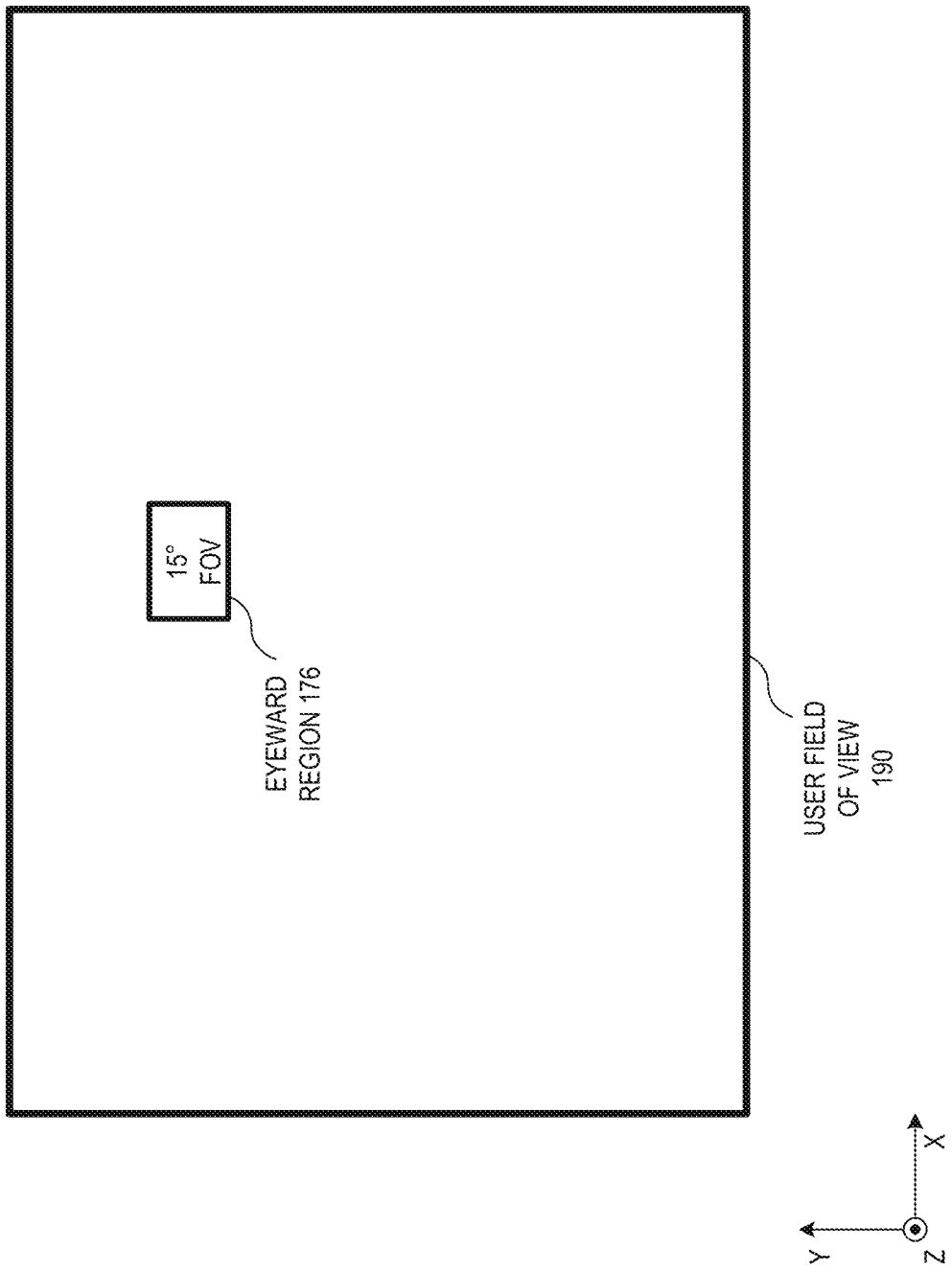

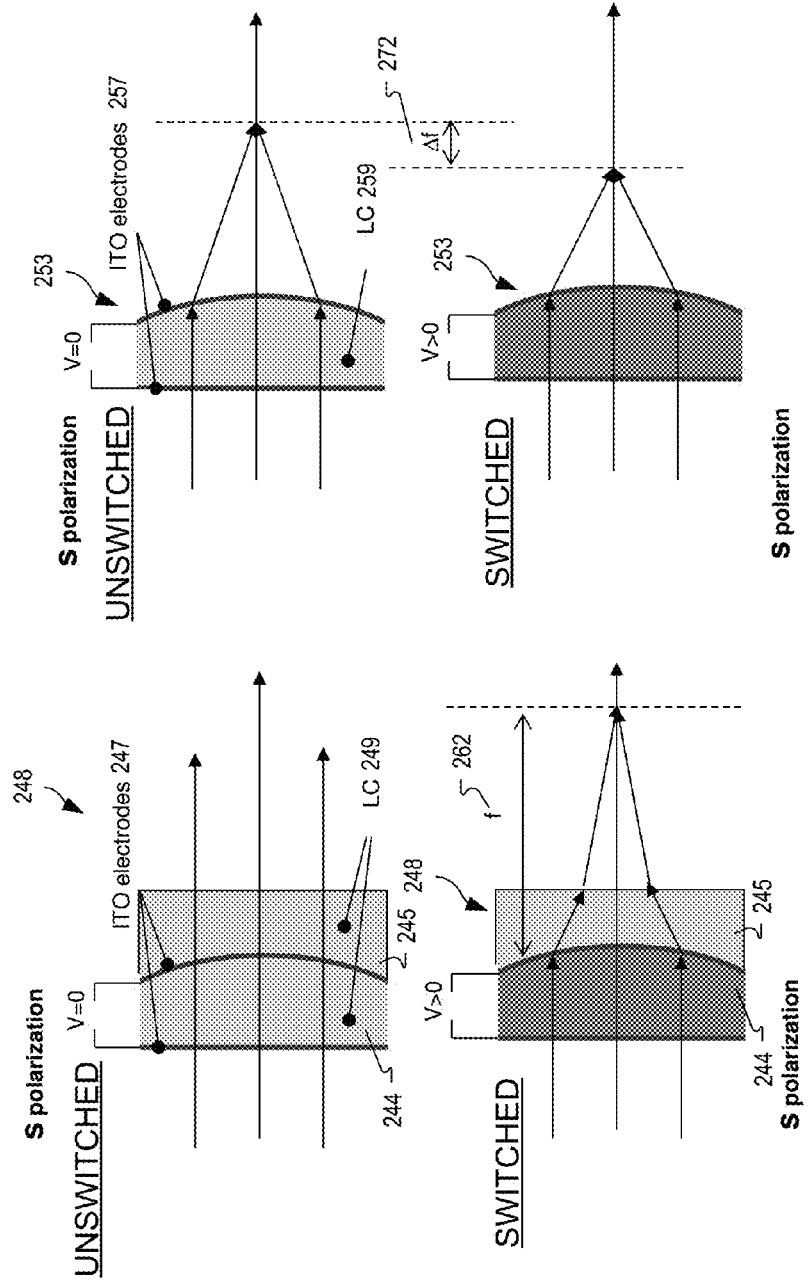

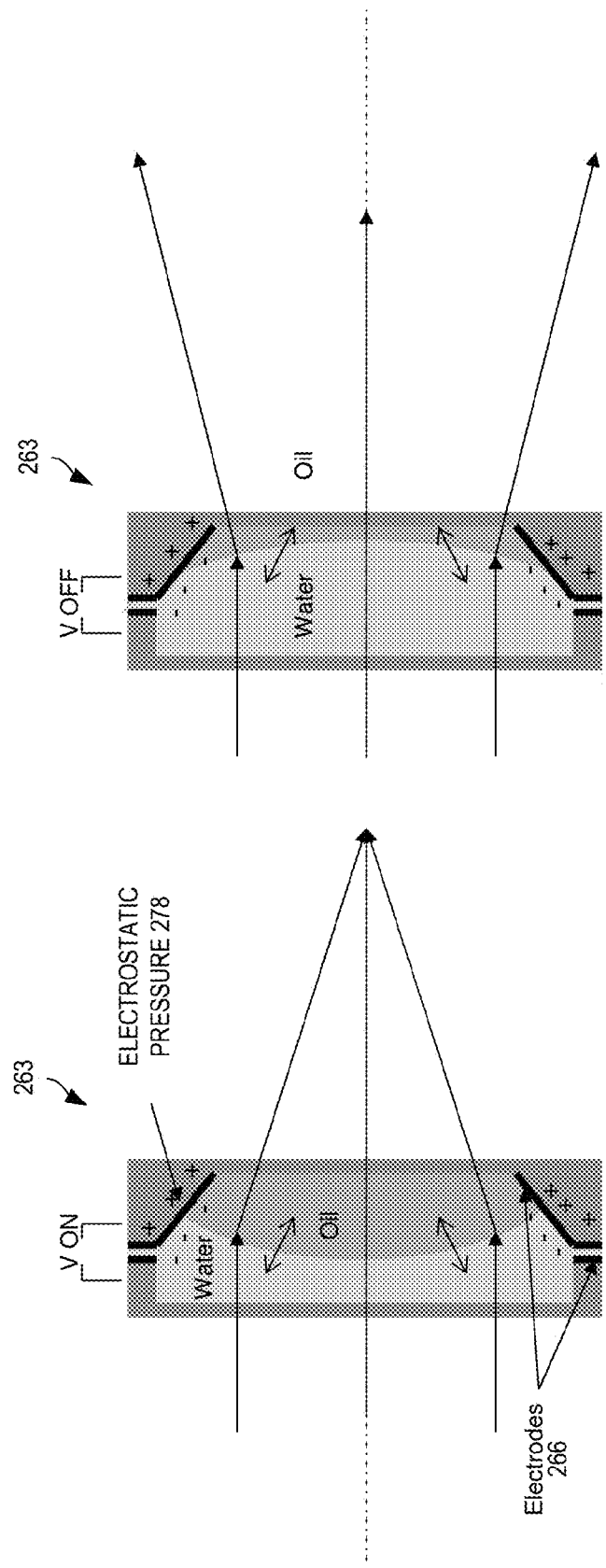

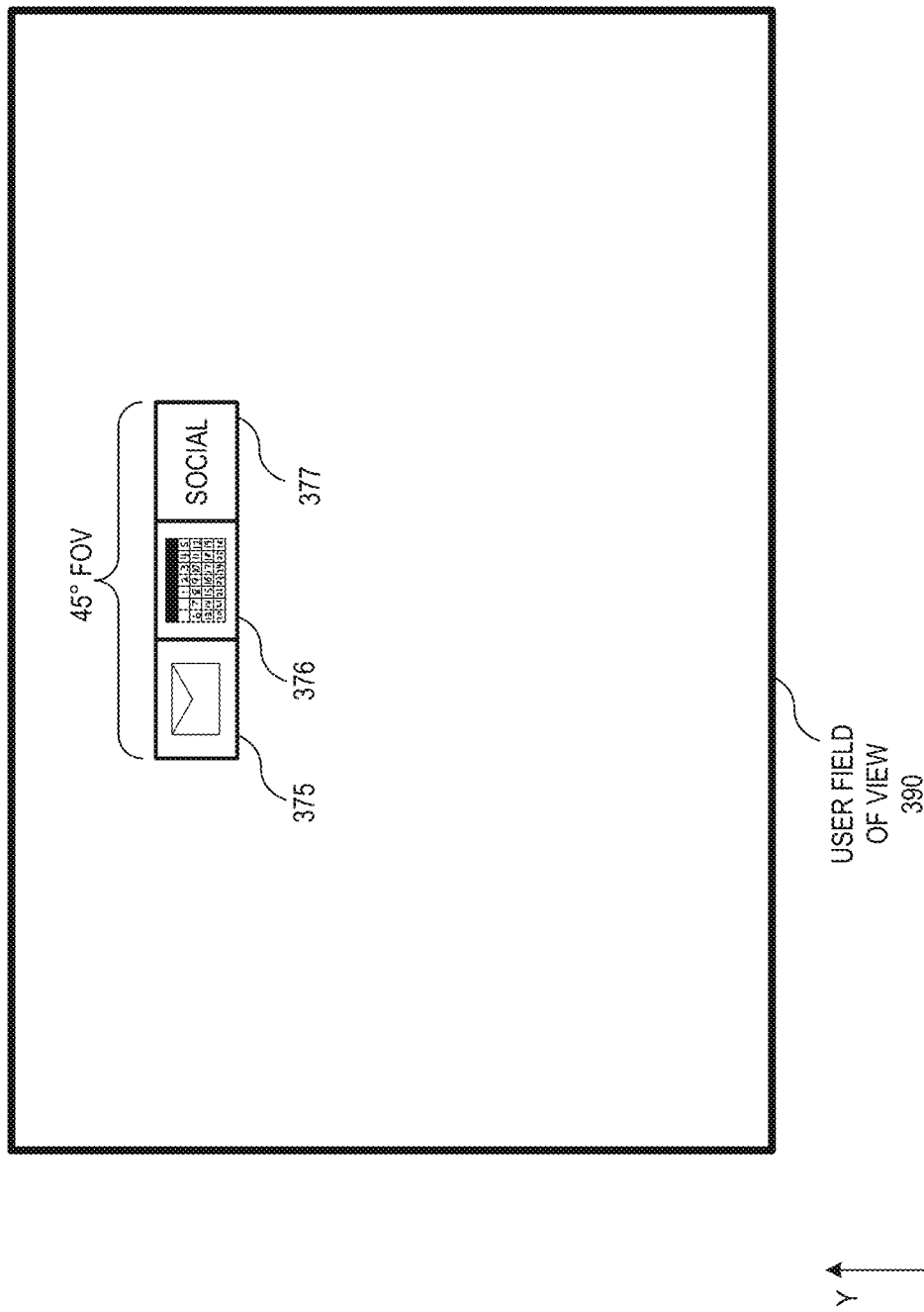

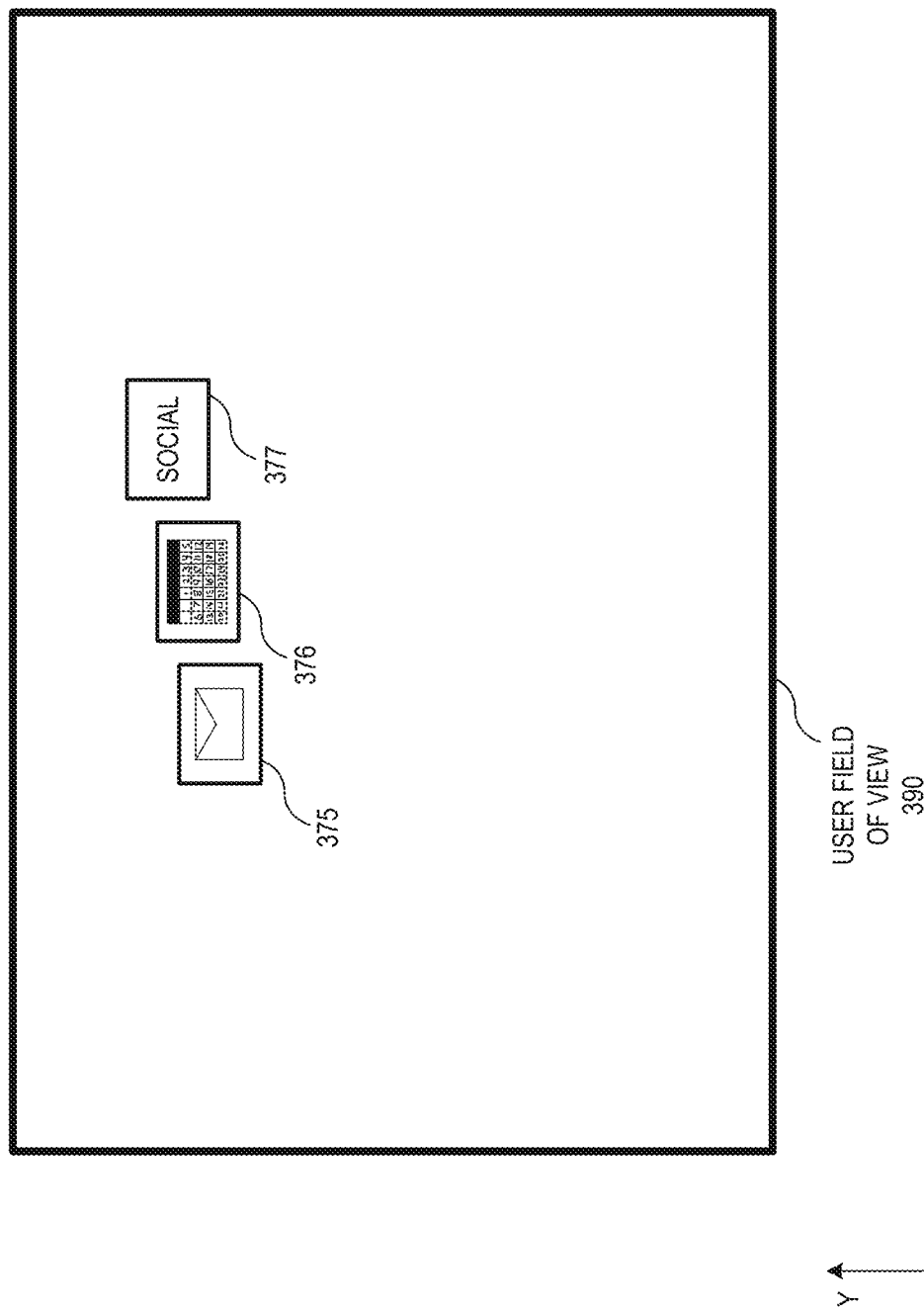

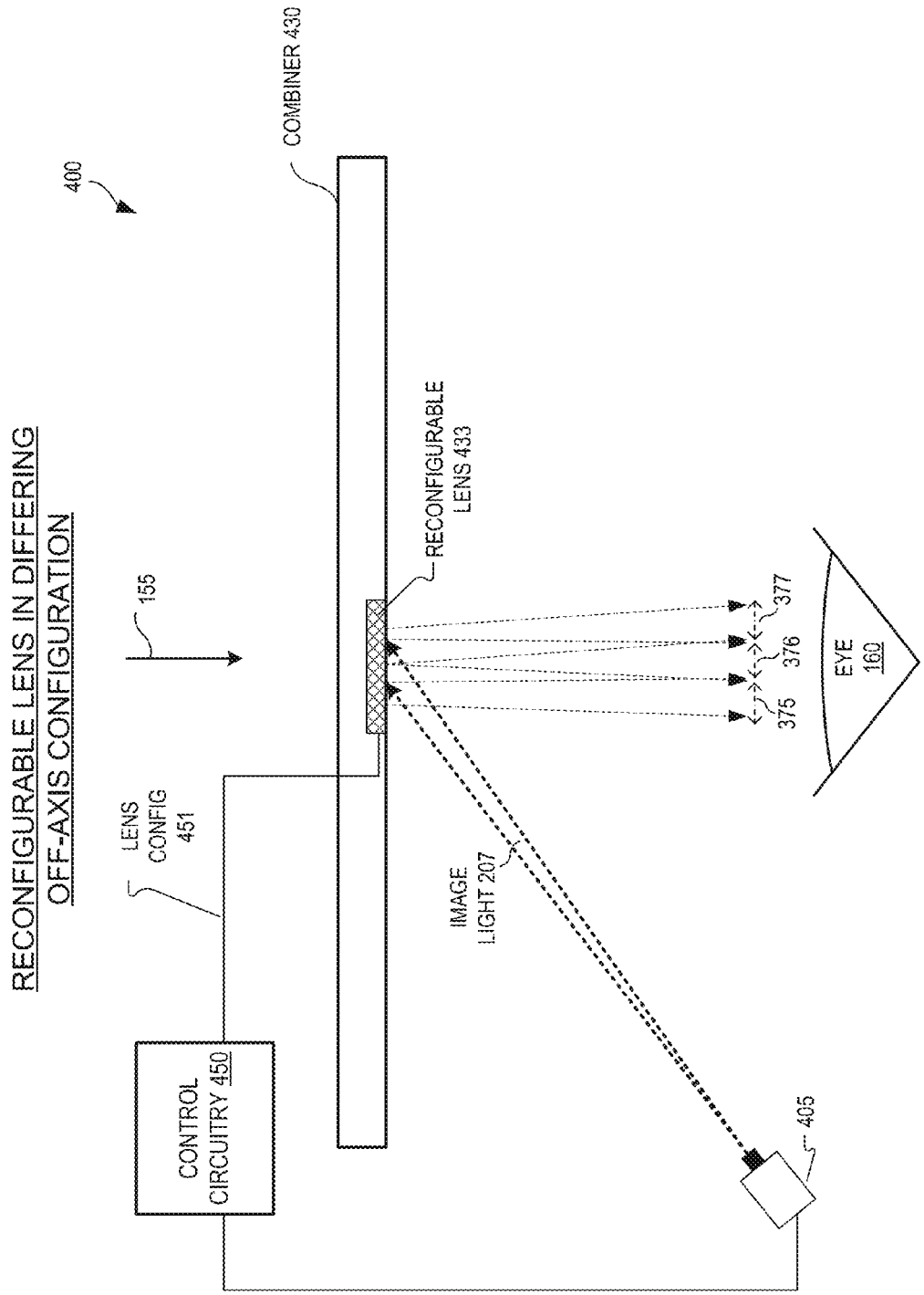

DYNAMIC LENS FOR HEAD MOUNTED DISPLAY

TECHNICAL FIELD

This disclosure relates generally to optics, and in particular but not exclusively, relates to Head Mounted Displays.

BACKGROUND INFORMATION

A head mounted display ("HMD") is a display device worn on or about the head. HMDs usually incorporate some sort of near-to-eye optical system to form a virtual image located somewhere in front of the viewer. Single eye displays are referred to as monocular HMDs while dual eye displays are referred to as binocular HMDs. Occlusion HMDs, also called immersion HMDs, project a virtual image over a black background (the projection optics are not see-through). See-through HMDs also project a virtual image, but they are at the same time transparent (or semi-transparent) and the projection optics are called combiner optics, since they combine the virtual image over the reality. Augmented reality is one aspect of see-through HMDs, where the virtual image is super-imposed to the reality.

HMDs have numerous practical and leisure applications. Historically, the first applications were found in aerospace applications, which permit a pilot to see vital flight control information without taking their eye off the flight path (these are referred to as Helmet Mounted Displays and are often used for rotary wing aircrafts). Heads Up Displays ("HUDs") are usually used in non-rotary wing aircrafts such as planes and jet fighters, where the combiner is located on the windshield rather than on the helmet. HUDs are also used in automobiles, where the optical combiner can be integrated in the windshield or close to the windshield. Public safety applications include tactical displays of maps and thermal imaging. Other application fields include video games, transportation, and telecommunications. There is certain to be newfound practical and leisure applications as the technology evolves; however, many of these applications are limited due to the size, weight, field of view, and efficiency of conventional optical systems used to implement existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 1B illustrates a computer generated image directed into an eyeward-region of an estimated field of view of a user of an optical combiner.

FIGS. 2B-2E illustrate examples of tunable lenses that can be utilized as the tunable lens in FIG. 2A, in accordance with an embodiment of the disclosure.

FIG. 3D illustrates computer generated images directed into different eyeward-regions that are stitched together, in accordance with an embodiment of the disclosure.

FIG. 3E illustrates computer generated images directed into different eyeward-regions that are not stitched together, in accordance with an embodiment of the disclosure.

FIG. 4A illustrates a display module launching image light and control circuitry coupled to control a reconfigurable lens positioned to direct the image light into different eyeward-regions, in accordance with an embodiment of the disclosure.

DETAILED DESCRIPTION

Embodiments of a Head Mounted Displays that include dynamic lenses are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
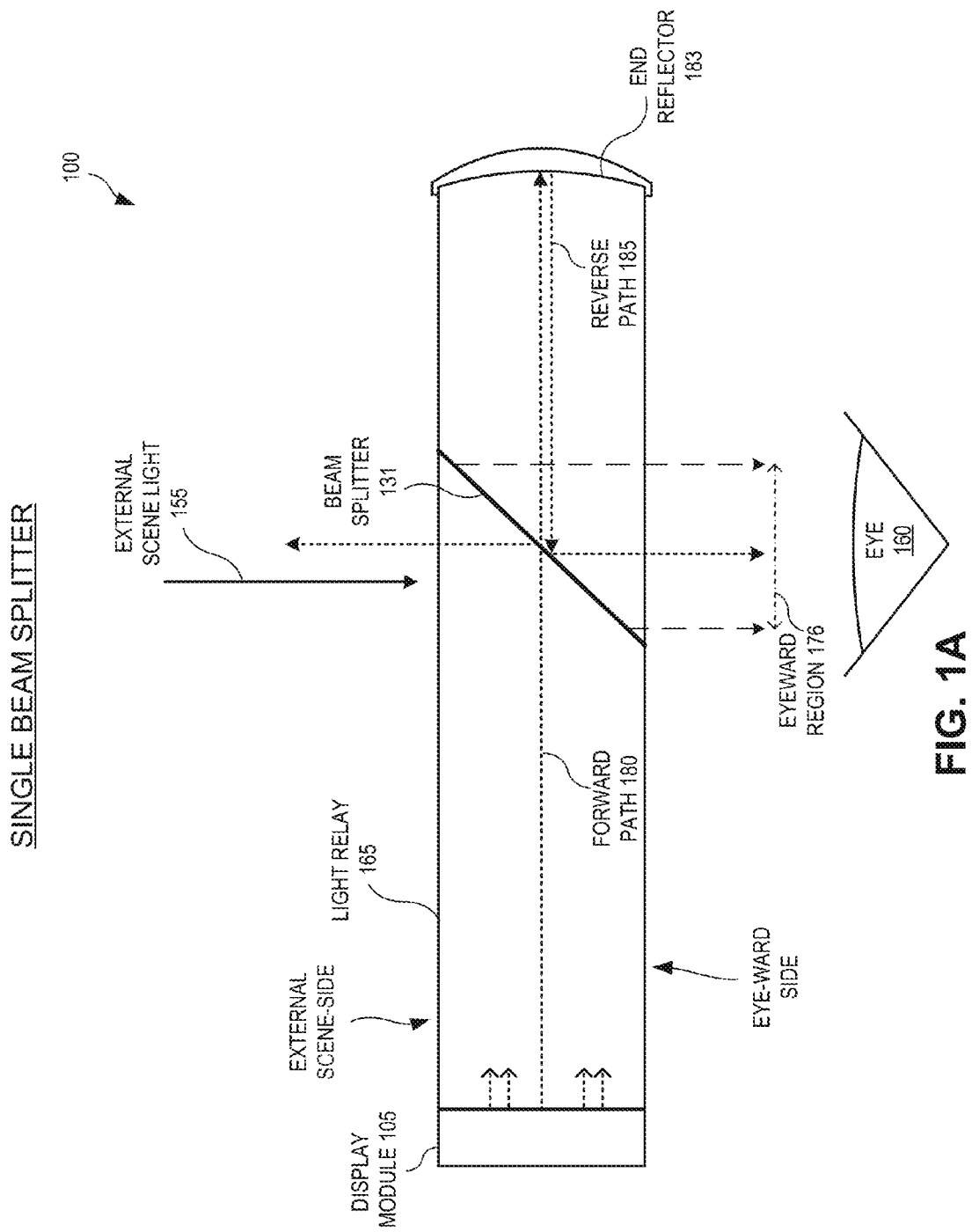
FIG. 1A depicts a top cross-section view of an example optical combiner including a display module, a light relay, a beam splitter, and an end reflector.

FIG. 1A depicts a top cross-section view of an example optical combiner 100 including a display module 105, a light relay 165, a beam splitter 131, and an end reflector 183. Optical combiner 100 may be integrated in a head gear to form a head mounted display ("HMD"). Display module 105 projects computer generated images ("CGI"). Display module 105 may be implemented by a light emitting diode ("LED") array, an organic LED ("OLED") array, a quantum dot array, a laser scanner, or otherwise. Display module 105 may also be implemented by a light source (e.g. laser, LED, or bulb) backlighting an LCD display or a liquid crystal on silicon ("LCOS") panel reflecting a light source. Display module 105 may be considered a "micro-display." End reflector 183 may be a concave mirror.

In operation, display module 105 launches display light (which may be CGI light) along a forward path 180 toward end reflector 183. Light relay 165 may have a transparent structure to permit most or a large part of the display light to pass through along forward path 180. Light relay 165 may be fabricated of a solid transparent material (e.g., glass, quartz, acrylic, clear plastic, PMMA, ZEONEX-E48R, etc.) or be implemented as a solid housing having an inner air gap through which the display light passes. Light relay 165 may operate to protect the optical path, but may not necessarily use total internal reflection ("TIR") to guide or confine the display light.

Along forward path 180, display light encounters beam splitter 131. Beam splitter 131 reflects a first portion of the display light towards the external scene-side of optical combiner 100 and passes a second portion of the display light. Beam splitter 131 may be a 45 degree 50/50 non-polarizing beam splitter, meaning it reflects 50 percent of light and passes the other 50 percent of light. The display light passed by beam splitter 131 continues along forward path 180 and end reflector 183 reflects back the display light along a reverse path 185. The display light along reverse path 185 encounters beam splitter 131, which reflects a portion of the display light along reverse path 185 toward an eye-ward side of optical combiner 100. The illustrated embodiment of FIG. 1A allows the display light launched by display module 105 to be projected into eye 160 of a user, which is how a computer generated image is directed into eyeward-region 176. In addition to directing images into eyeward-region 176, optical combiner 100 may also allow at least a portion of external scene light 155 to reach eye 160 (after a portion is reflected by beam splitter 131).

FIG. 1B illustrates a computer generated image directed into eyeward-region 176 which is in an estimated field of view ("FOV") 190 of a user of optical combiner 100. In FIG. 1B, FOV 190 and eyeward-region 176 are defined within an x-y plane. A typical user of an HMD may have a natural field of view ("FOV") of nearly 180° horizontally. An image presented within eyeward-region 176 from optical combiner 100 may only be presented to the user in 15° (horizontally) of the user's total FOV and only within the x-y plane. In certain contexts, it would be advantageous to present images and information to a user in different depths (z-axis) of FOV 190 and in more than 15° (horizontally) of the user's total FOV.

Figure 2A:
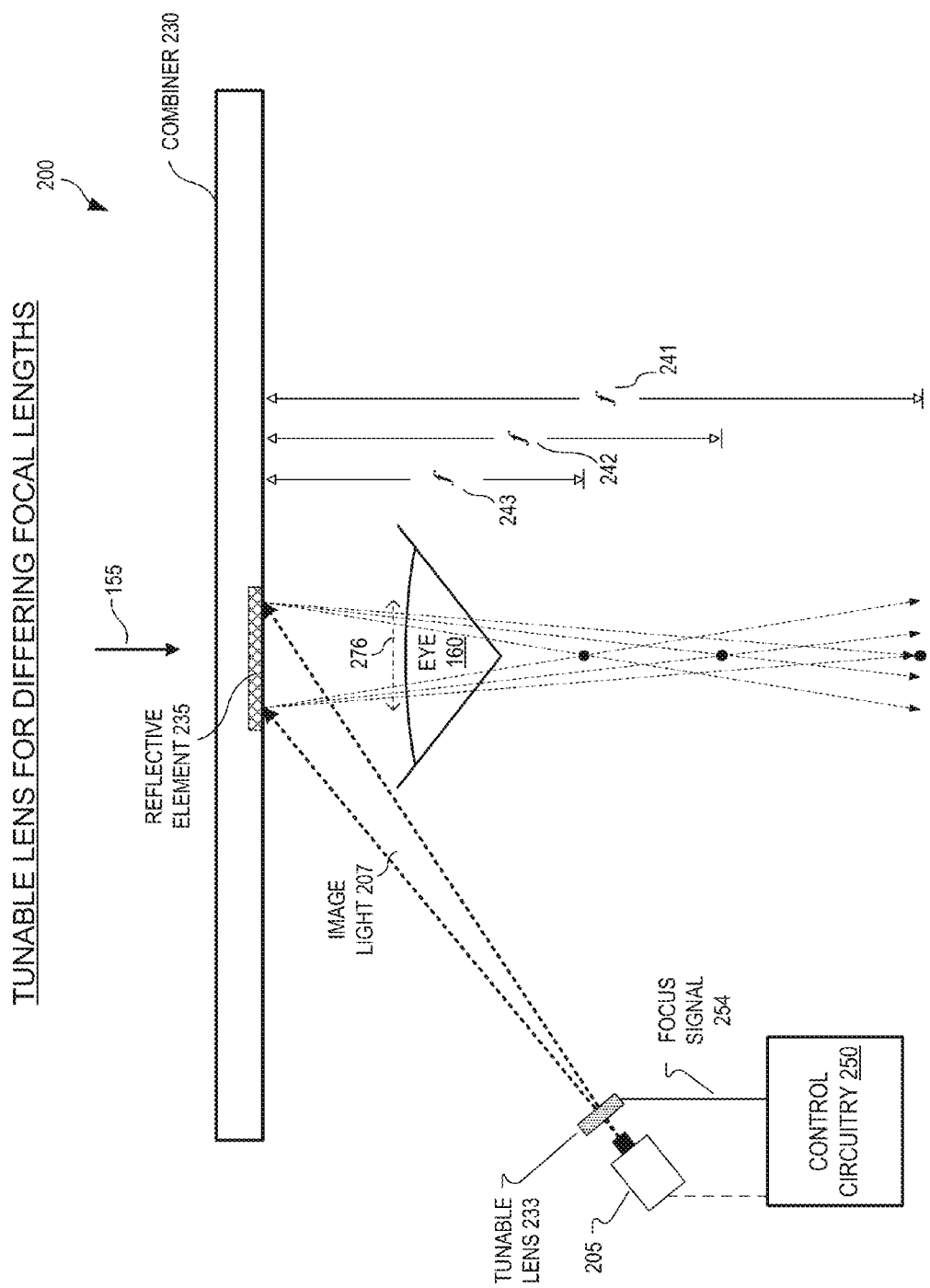
FIG. 2A illustrates control circuitry controlling a tunable lens that receives image light to be directed into an eyeward-region, in accordance with an embodiment of the disclosure.

FIG. 2A illustrates control circuitry 250 controlling a tunable lens 233 that receives image light 207 to be directed into an eyeward region 276, in accordance with an embodiment of the disclosure. Display module 205 generates image light 207 that propagates through tunable lens 233 and combiner 230 includes a reflective element 235 that directs image light 207 to eyeward region 276. Reflective element 235 is a flat 50/50 mirror that reflects fifty percent of incident light and passes the remaining fifty percent of incident light, in some embodiments. Combiner 230 may be integrated as an eyepiece in a monocular or binocular HMD. Combiner 230 may be generally transparent and fabricated of a solid transparent material (e.g., glass, quartz, acrylic, clear plastic, PMMA, ZEONEX-E48R, etc.). The generally transparency of combiner 230 allows external scene light 155 to propagate to eye 160 to allow a user to view her environment when combiner 230 is in front of a user's eye 160. If reflective element 235 is also partially transparent (e.g. passing fifty percent of incident light), it will also allow some of external scene light 155 to propagate to eye 160. Display module 205 may be implemented by a light emitting diode ("LED") array, an organic LED ("OLED") array, a quantum dot array, a laser scanner, or otherwise. Display module 205 may also be implemented by a light source (e.g. laser, LED, or bulb) backlighting an LCD display or a liquid crystal on silicon ("LCOS") panel reflecting a light source. Display module 105 may be considered a "micro-display."

Control circuitry 250 may include a processor, a Field Programmable Gate Array ("FPGA"), or other processing logic. Control circuitry 250 may include buffers and/or memory to store instructions, settings, images, and other data. In FIG. 2A, control circuitry 250 is coupled to a transmissive tunable lens 233 and configured to adjust a focal length of tunable lens 233 to focus image(s) included in image light 207 at varying focus depths. Control circuitry 250 sends a focus signal 254 to tunable lens 233 to adjust the focal length of tunable lens 233. Focus signal 254 may be digital or analog. The focal length of tunable lens 233 may be continuously variable in response to focus signal 254. In one embodiment, tunable lens 233 has defined discrete focal length positions that it can switch between in response to focus signal 254.

Tunable lenses can be purchased from VariOptic of France, for example. A stretchable radially symmetric membrane (not illustrated) developed by Optotune of Switzerland can also be utilized as tunable lens 233.

FIGS. 2B-2E illustrate examples of tunable lenses that can be utilized as tunable lens 233, in accordance with an embodiment of the disclosure. FIG. 2B illustrates a liquid crystal ("LC") tunable lens 248 that includes liquid crystals 249. Liquid crystals 249 are disposed in a region 245 and a region 244 between two electrodes 247. The first of the two of the electrodes 247 is flat and on the receiving side of tunable lens 248, while the second electrode is curved. The exiting side of tunable lens 248 (where the S-polarized display light exits) is opposite of the receiving side of tunable lens 248 and is parallel to the receiving side. When tunable lens 248 is unswitched (no voltage is applied across the electrodes 247), S-polarized light received by the lens encounters the same refractive index as the liquid crystals 249 in both regions 244 and 245 are oriented similarly. Therefore, tunable lens 248 is substantially transparent and offers substantially no optical power to the received S-polarized light because the receiving side and the exiting side are parallel and the refractive index in regions 244 and 245 between the receiving side and exiting side are the same. However, when tunable lens 248 is switched (a voltage is applied across electrodes 247), the orientation of the liquid crystals 249 in region 244 changes, which effects the refractive index encountered by S-polarized display light. Since region 244 is shaped like a lens and has a different refractive index than region 245 while a voltage is applied across electrodes 247, the shape of region 244 acts as a lens and focuses S-polarized display light at a focal length 262. In some embodiments, focus signal 254 is a voltage that is applied across electrodes 247.

FIG. 2C illustrates tunable lens 253 that operates using a similar concept as tunable lens 248. However, in FIG. 2C, tunable lens 253 retains optical power for S-polarized display light even when it is unswitched due to the curve of the second electrode 257 also being the exiting side of tunable lens 253 that is not parallel to the receiving side of tunable lens 253. When tunable lens 253 is switched, the orientation of liquid crystals 259 changes which changes the refractive index encountered by S-polarized display light. The different refractive index changes the focal length (and corresponding optical power) of the tunable lens 253 by a focal length delta 272.

FIGS. 2D and 2E shows a tunable liquid lens 263 that can be used as tunable lens 233, in accordance with an embodiment of the disclosure. FIG. 2D shows tunable liquid lens 263 when a voltage is applied to electrodes 266. Utilizing hydrophobic principles, the voltage on electrodes 266 generates electrostatic pressure 278 that bends the interface between the illustrated water and oil in tunable liquid lens 263. In FIG. 2D, electrostatic pressure 278 give tunable liquid lens 263 positive (converging) optical power. In FIG. 2E, no voltage is applied to electrodes 266, which relaxes the electrostatic pressure and tunable liquid lens 263 has negative (diverging) optical power.

Referring back to FIG. 2A, control circuitry 250 may be coupled to control display module 205 to include different images in image light 207. In one embodiment, control circuitry 250 is configured to control display module 205 to include a first image, a second image, and a third image in image light 207 while also controlling tunable lens 233 to adjust tunable lens 233 to a first focal length 241 while the first image is displayed, adjusting tunable lens 233 to a second focal length 242 while the second image is displayed, and adjusting tunable lens 233 to a third focal length 243 while the third image is displayed. Although focal lengths 241, 242, and 243 are only illustrated from reflective element 235 in FIG. 2A, focal lengths 241, 242, and 243 of tunable lens 233 are measured along an optical path from tunable lens 233 to a given focal point. The effect of choosing different focal lengths (e.g. 241, 242, and 243) allows optical system 200 to present three images with associated depths in the same eyeward-region 276. The focal point (illustrated as black filled circles) from each focal length may be behind eye 160 in order to produce virtual images that a viewer's eye 160 can focus on. Those skilled in the art will appreciate that even though the focal points of the various focal lengths are illustrated behind eye 160, the lens in eye 160 will further focus images in image light 207 onto the back of the eye so they will be in focus for the user.

Control circuitry 250 may be configured to interlace images at a frequency (e.g. 240 Hz.) that is imperceptible to a human eye 160. In one example, the first image is displayed for 10 ms while tunable lens 233 is at the first focal length 241, no image is displayed for 1 ms while tunable lens is adjusted to the second focal length 242, the second image is then displayed for 10 ms while tunable lens 233 is at the second focal length 242, no image is displayed for 1 ms while tunable lens 233 is adjusted to the third focal length 243, and then third image is then displayed for 10 ms while tunable lens 233 is at the third focal length 243. The 1 ms periods of time where no image is displayed ensures that images are not displayed while tunable lens 233 is transferring between focal lengths.

Figure 2F:
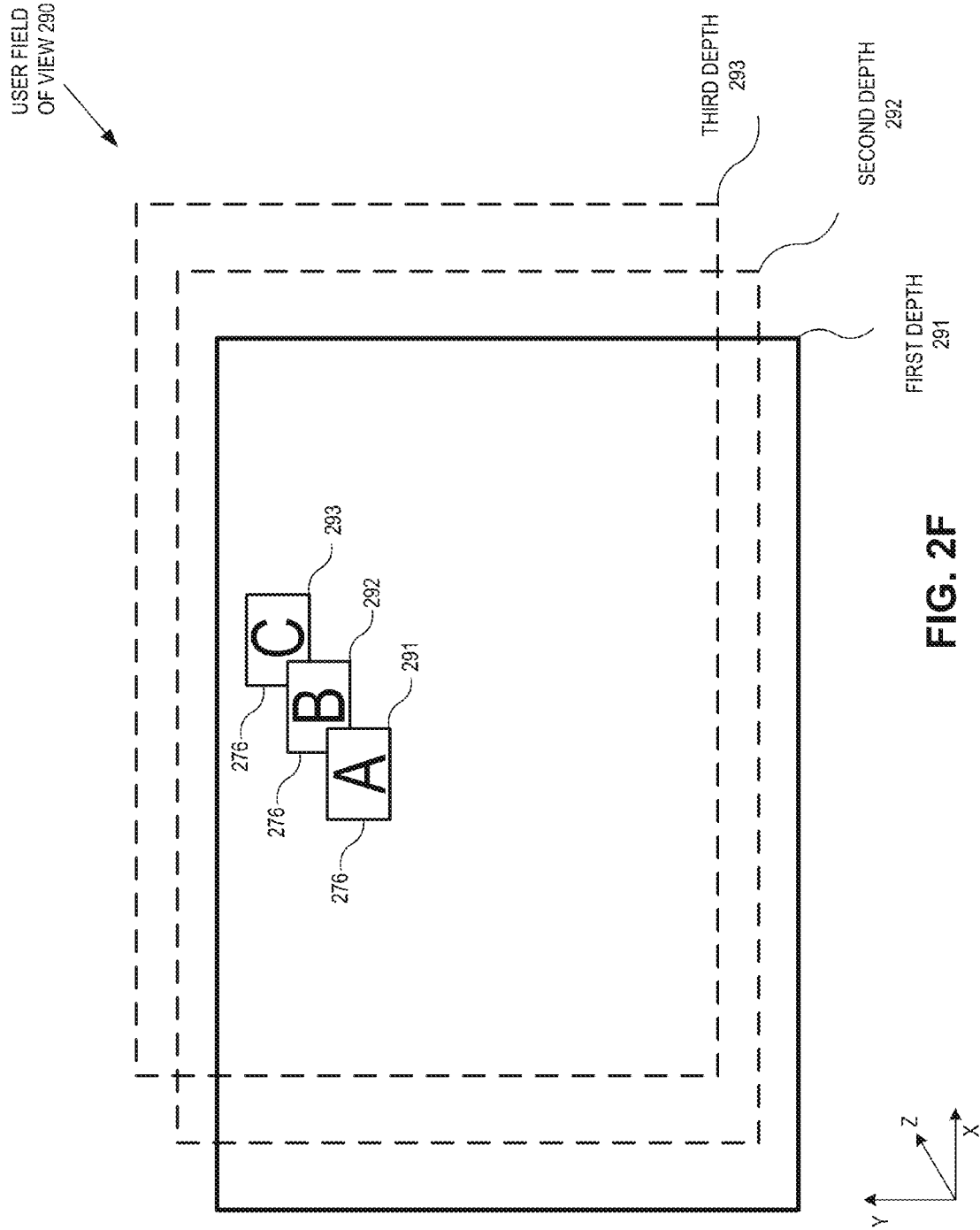
FIG. 2F illustrates computer generated images directed into different depths of the same eyeward-region by a tunable lens, in accordance with an embodiment of the disclosure.

FIG. 2F illustrates computer generated images directed into different depths of the same eye-ward region 276 by tunable lens 233, in accordance with an embodiment of the disclosure. In FIG. 2F, the first image is illustrated as the letter "A" and is presented to eye 160 at a first focus depth 291. The second image is illustrated as the letter "B" at a second focus depth 292. The third image is illustrated as the letter "C" at a third focus depth 293. The first, second, and third images are focused in the same x-y coordinates of eyeward-region 276, but they have different depths (z-axis). The virtual images (e.g. first, second, and third images) in image light 207 may be located in the range of a few meters in front of the viewer's eye 160, depending on what focal length of tunable lens 233 is presenting the image. In one example, the first image is presented at one meter, the second image is presented at two meters, and the third image is presented at three meters. A user may perceive a superimposed combination of the first, second, and third images, due to their different depths.

Figure 3A:
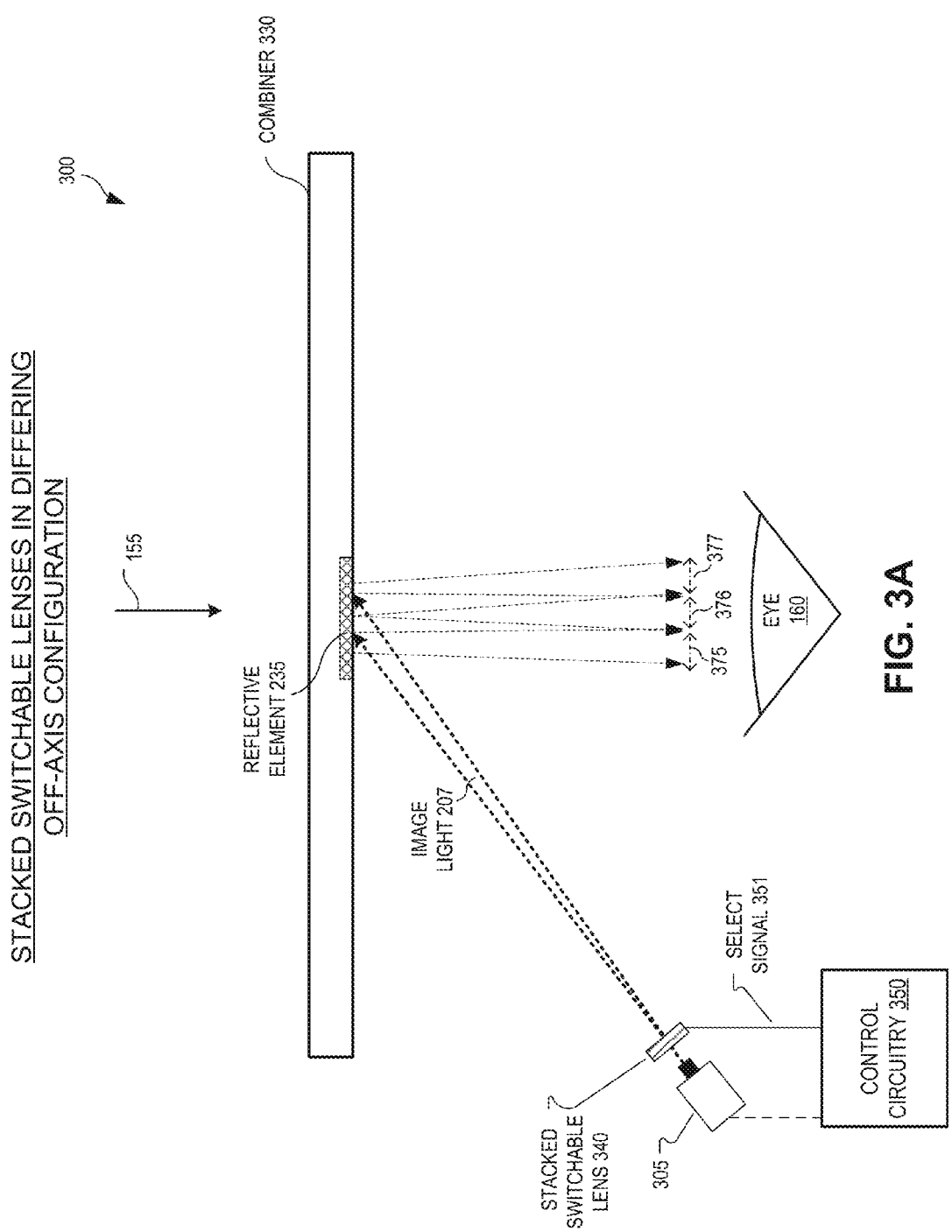
FIG. 3A illustrates control circuitry controlling a stacked switchable lens that receives image light to be directed into different eyeward-regions, in accordance with an embodiment of the disclosure.

FIG. 3A illustrates control circuitry 350 controlling a stacked switchable lens 340 that receives image light 207 to be directed into different eyeward-regions, in accordance with an embodiment of the disclosure. Display module 305 generates image light 207 that propagates through stacked switchable lens 340 and combiner 330 includes a reflective element 235 that directs image light 207 to eyeward regions 375, 376, and 377. Display module 305 may be substantially similar to display module 205 and combiner 330 may be substantially similar to combiner 230. Control circuitry 350 may include a processor, a Field Programmable Gate Array ("FPGA"), or other processing logic. Control circuitry 350 may include buffers and/or memory to store instructions, settings, images, and other data.

Figure 3B:
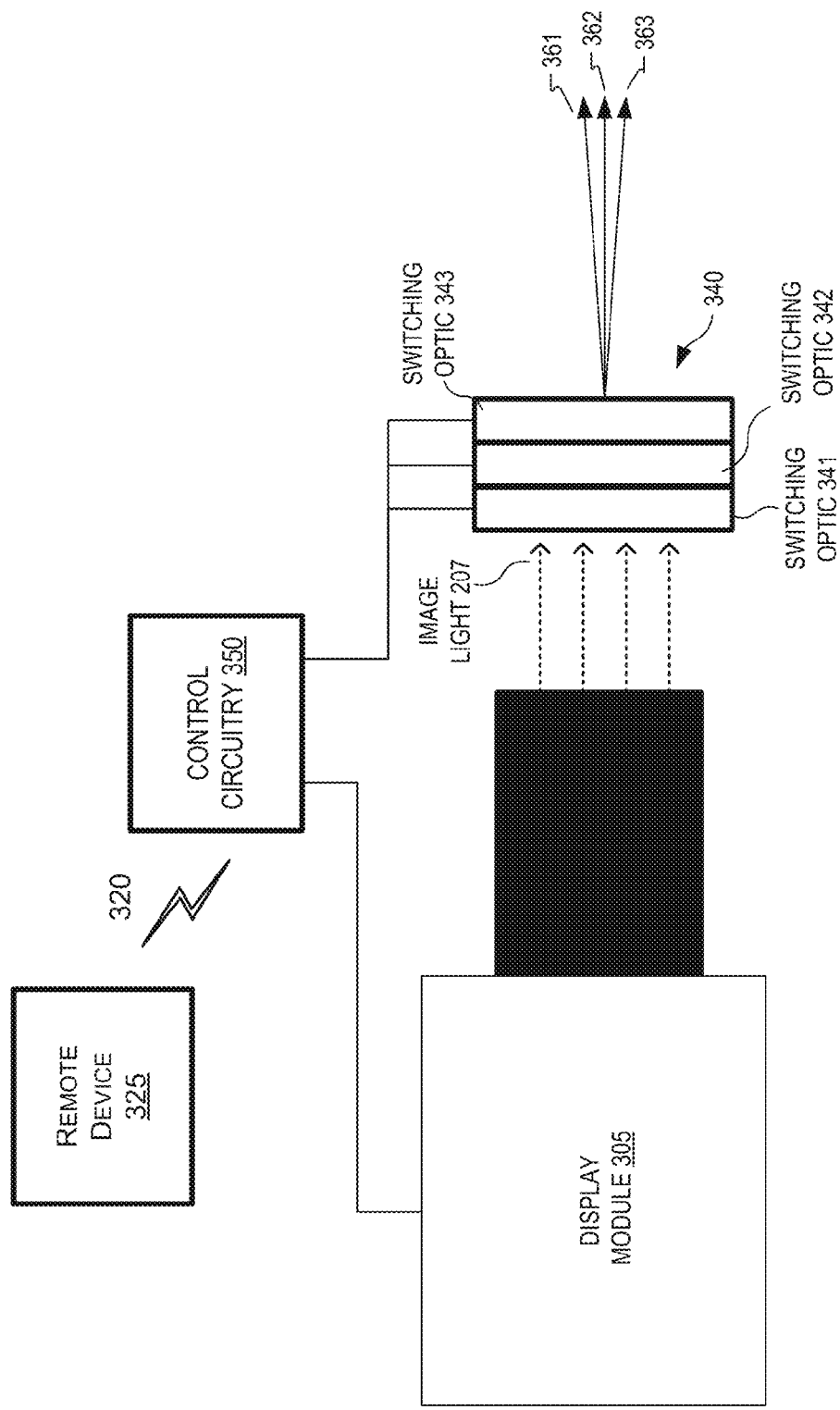
FIG. 3B illustrates a display module and control circuitry controlling an example stacked switchable lens that includes three switching optics, in accordance with an embodiment of the disclosure.

Stacked switchable lens 340 is a transmissive stacked switchable lens 340, in the illustrated embodiment. FIG. 3B illustrates control circuitry 350 coupled to selectively activate a first switching optic 341, a second switching optic 342, and a third switching optic 343. Each switching optic, when activated, has a static prescription. The prescriptions for the different switching optics may vary by off-axis amount and/or focal length. When the switching optic is not activated, it has no prescription and is substantially transparent.

In FIG. 3B, when control circuitry 350 activates switching optic 341 (and switching optics 342 and 343 are not activated and substantially transparent), image light 207 is directed in direction 361 because the prescription of switching optic 341 includes off-axis lensing properties. When control circuitry 350 activates switching optic 342 (and switching optics 341 and 343 are not activated and substantially transparent), image light 207 is directed in direction 362. In the illustrated embodiment, switching optic 342 may not necessarily include off-axis lensing properties. In other embodiments, switching optic 342 includes off-axis properties. When control circuitry 350 activates switching optic 343 (and switching optics 341 and 342 are not activated and substantially transparent), image light 207 is directed in direction 363.

Control circuitry 350 is also coupled to display module 305, in FIG. 3B. Control circuitry 350 may be configured to control display module 305 to include a first image in image light 207 while activating switching optic 341 (and not activating switching optics 342 and 343) so that the first image is directed in direction 361. Then, control circuitry may deactivate switching optic 341 and activate switching optic 342 while directing display module 305 to include a second image in image light 207 so that the second image will be directed in direction 362. Display module 305 may then include a third image in image light 207 (at the direction of control circuitry 350) while activating switching optic 343 (while switching optics 341 and 342 are deactivated) so that the third image is directed in direction 363. The images may be interlaced at a frequency high enough to be imperceptible to the human eye, due to the persistence of the images on eye 160. In other words, display module 305 may cycle through the displayed images fast enough to be unnoticed by a user (the user will perceive that the first, second, and third images are displayed simultaneously), due to the persistence of light on eye 160.

In FIG. 3B, control circuitry 350 may be connected to a network to receive and transmit information. In the illustrated embodiment, control circuitry 350 is using a communication link 320 (e.g., a wired or wireless connection) to a remote device 325, which may be a server. Control circuitry 350 may receive data from remote device 325, and configure the data for display with display module 305. Remote device 325 may be any type of computing device or transmitter including a laptop computer, a mobile telephone, or tablet computing device, etc., that is configured to transmit data to control circuitry 350. Remote device 325 and control circuitry may contain hardware to enable the communication link 320, such as processors, transmitters, receivers, antennas, etc. Further, remote device 325 may take the form of or be implemented in a computing system that is in communication with and configured to perform functions on behalf of a client device, such as an HMD.

In FIG. 3B, communication link 320 is illustrated as a wireless connection; however, wired connections may also be used. For example, the communication link 320 may be a wired serial bus such as a universal serial bus or a parallel bus. A wired connection may be a proprietary connection as well. The communication link 320 may also be a wireless connection using, e.g., Bluetooth® radio technology, communication protocols described in IEEE 802.11 (including any IEEE 802.11 revisions), Cellular technology (such as GSM, CDMA, WiMAX, or LTE), or Zigbee® technology, among other possibilities. The remote device 325 may be accessible via the Internet and may include a computing cluster associated with a particular web service (e.g., social-networking, photo sharing, address book, etc.).

Figure 3C:
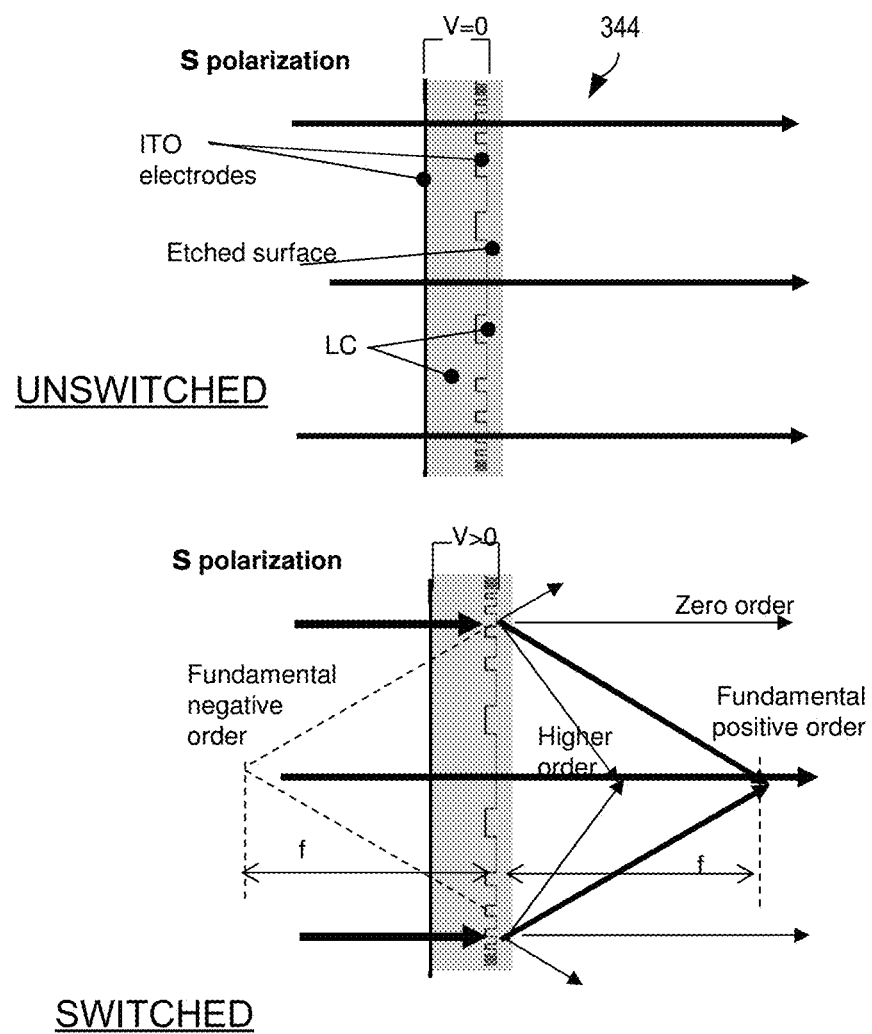
FIG. 3C illustrates an example switching optic configuration that can be utilized within a stacked switchable lens, in accordance with an embodiment of the disclosure.

FIG. 3C illustrates an examples of a switching optic configuration that can be utilized within stacked switchable lens 340, in accordance with an embodiment of the disclosure. FIG. 3C shows a switchable holographic optic technology that is known as holographic polymer dispersed liquid crystal ("HPDLC"). While a HPDLC is activated (switched on), it affects light according to the laws of the holographic optics recorded in the holographic medium. However, while the switchable hologram is deactivated (switched off), the switchable holographic optic may appear essentially transparent to light that encounters the switchable holographic optic, and act as a simple transparent window. When the switchable holographic optic is switched off, it may slightly affect the light that encounters it because of an index of refraction change associated with the holographic medium. As a brief overview, HPDLC technology uses electrical stimulation to align liquid crystals (mixed with a photoactive hologram medium) to form diffractive gratings. The electrical stimulation may then rotate the liquid crystals patterns to appear essentially transparent for a specific polarization, such that the liquid crystals are no longer forming diffractive gratings. HPDLC technology may be switchable from on to off in 50 us or faster, for example. HDPLC technology is available for purchase from SGB Labs in Sunnyvale, Calif.

In FIG. 3C, liquid crystals are disposed on both sides of an etched surface that is etched as a diffractive grating. When no voltage is applied to ITO electrodes of HDPLC lens 344 (unswitched), the refractive index encountered by S-polarized light is the same and HDPLC lens 344 is essentially transparent to incident S-polarized light. However, when a voltage is applied to the ITO electrodes of HDPLC lens 344 (switched), the refractive index between the ITO electrodes changes and since one of the ITO electrodes is shaped as diffractive grating, the diffractive grating at the interface between the two different refractive indexes "acts" on incoming S-polarized light. In the illustrated embodiment, the diffractive grating has positive optical power and focuses the S-polarized light at a focal length. The HDPLC lens 344 illustrated in FIG. 3C may be used as switching optic 342 when switching optic 342 does not include off-axis lensing properties. When a switching optic (e.g. 341 and 343) includes off-axis lensing properties, the off-axis lensing properties can be "written" into the hologram of the HDPLC lens.

In one embodiment, each switching optic (e.g. 341-343) is tuned to act on specific wavelengths of light (using Bragg selectivity principles) based on the angle that image light 207 from display module 305 will encounter the switching optic. Each switching optic may have only one Bragg selectivity to one specific spectrum (spectral bandwidth), or one specific angle (angular bandwidth) and those holographic optics may be referred to as having "singular selectivity." Each switching optic may also be configured to include more than one Bragg selectivity, as it is possible to "record" more than one Bragg selectivity into a given holographic medium. Consequently, when activated, each of switching optics 341, 342, and 343 may be configured to direct multiple specific spectrums (e.g. red, green, and blue) of image light 207 toward eye 160. In one embodiment, each switching optic has three Bragg selective wavelengths and a significant amount of image light 207 is centered around the three Bragg selective wavelengths. Switching optics configured to operate on more than one specific spectrum (having more than one Bragg selectivity) may be referred to as having "plural selectivity."

FIG. 3D illustrates computer generated images directed into different eyeward-regions 375, 376, and 377 that are stitched together, in accordance with an embodiment of the disclosure. Eyeward-regions 375, 376, and 377 are within a user's FOV 390. First switching optic 341, when activated, directs image light 207 to first eyeward-region 375. In FIG. 3D, the first image in eyeward-region 375 is illustrated as an envelope. Second switching optic 342, when activated, directs image light 207 to second eyeward-region 376. The second image in eyeward-region 376 is illustrated as a monthly calendar. Third switching optic 343, when activated, directs image light 207 to third eyeward-region 377. The third image in eyeward-region 377 is illustrated as the word "SOCIAL."

In FIG. 3D, the first, second, and third images are stitched together as a contiguous image having a 45° FOV, which increases the 15° FOV illustrated in FIG. 1B. Furthermore, the FOV is increased without necessarily requiring an increase in the size of display module 305 or shortening the focal length of the optical combiner, which is prone to create a "bug eye" aesthetic because of the curvature requirements of the combiner lens. Instead, the amount of off-axis in each of the first, second (if any), and third switching optics 341, 342, and 343 is designed to create the contiguous image with a 45° FOV. It is understood that a user's eye 160 may look straight ahead to view the second image in eyeward-region 376, slightly to the left to view eyeward-region 375, and slightly to the right to view eyeward-region 377, in some embodiments. In the illustrated embodiment, the first, second, and third images are all at approximately the same depth (z-axis) because their corresponding switching optics have the same focal length. However, it is appreciated that adjusting the focal length of the first, second, and third switching optics 341, 342, and 343 will have corresponding changes in the depth of the images in FOV 390. In one embodiment, off-axis lensing properties are written into switching optics 341 and 343, but switching optic 342 includes no off-axis lensing properties.

FIG. 3E illustrates computer generated images directed into different eyeward-regions 375, 376, and 377 that are not stitched together, in accordance with an embodiment of the disclosure. Similarly to FIG. 3D, eyeward-regions 375, 376, and 377 are within a user's FOV 390. However, in FIG. 3E the first, second, and third images are not stitched together as a contiguous image. However, the user's FOV is still extended farther than the 15° FOV illustrated in FIG. 1B. The amount of off-axis in each of the first, second, and third switching optics is designed to create the noncontiguous images, in FIG. 3E. It is appreciated that adjusting the off-axis amount of the different switching optics can move the first, second, and third images within the users FOV 390, as desired. In the illustrated embodiment, the first, second, and third images are all at the same depth (z-axis) because their corresponding switching optics have the approximately the same focal length. However, it is appreciated that adjusting the focal length of the first, second, and third switching optics is possible and will have corresponding changes in the focus depth of images in FOV 390.

In both embodiments illustrated in FIGS. 3D and 3E, control circuitry 350 may cause display module 305 to interlace the first, second, and third images into image light 207. Control circuitry 350 may then activate first switching optic 341 (to direct the first image to eyeward-region 375) when the first image is included in image light 207, activate second switching optic 342 (to direct the second image to eyeward region 376) when the second image is included in image light 207, and activate third switching optic 343 (to direct the third image to eyeward-region 377) when the third image is included in image light 207. Control circuitry 350 may orchestrate the interlacing of the images at a refresh rate (e.g. 240 Hz) that generates persistent images upon eye 160.

FIG. 4A illustrates a display module 405 launching image light 207 and control circuitry 450 coupled to control a reconfigurable lens 433 positioned to direct image light 207 into different eyeward-regions 375, 376, and 377, in accordance with an embodiment of the disclosure. Display module 405 generates image light 207 and reconfigurable lens 433 receives image light 207 and directs image light 207 to eyeward-regions 375, 376, and 377, depending on a lens state of reconfigurable lens 433. Display module 405 may be substantially similar to display module 205 and combiner 430 may be substantially similar to combiner 230. Control circuitry 450 may include a processor, a Field Programmable Gate Array ("FPGA"), or other processing logic. Control circuitry 450 may include buffers and/or memory to store instructions, settings, images, and other data.

In FIG. 4A, control circuitry 450 is coupled to a reconfigurable lens 433 and reconfigurable lens 433 is reconfigurable into different lens states in response to lens configuration signal 451. Lens configuration signal 451 may be digital or analog. The optical power and off-axis properties of each lens state of reconfigurable lens 433 may be configured within the constraints of reconfigurable lens 433. Reconfigurable lens 433 can be tuned to different lens states arbitrarily (within its constraints) in real time. Control circuitry 450 may cause display module 405 to interlace a first, second, and third image into image light 207. Control circuitry 450 may then reconfigure lens 433 to a first lens state to direct the first image to eyeward-region 375 when the first image is included in image light 207, reconfigure lens 433 to a second lens state to direct the second image to eyeward-region 376 when the second image is included in image light 207, and reconfigure lens 433 to a third lens state to direct the third image to eyeward-region 377 when the third image is included in image light 207. Control circuitry 450 may orchestrate the interlacing of the images at a refresh rate (e.g. 120 Hz) that generates persistent images upon eye 160. Reconfiguring the reconfigurable lens 433 to different lens states (each with their own optical power and off-axis properties) in concert with generating images with display module 405 can achieve the arrangement of the first, second, and third images as one contiguous persistent image, as illustrated in FIG. 3D. Similarly, optical system 400 can achieve the arrangement of the first, second, and third images, as illustrated in FIG. 3E.

Figures 4B, 4C, 4D:
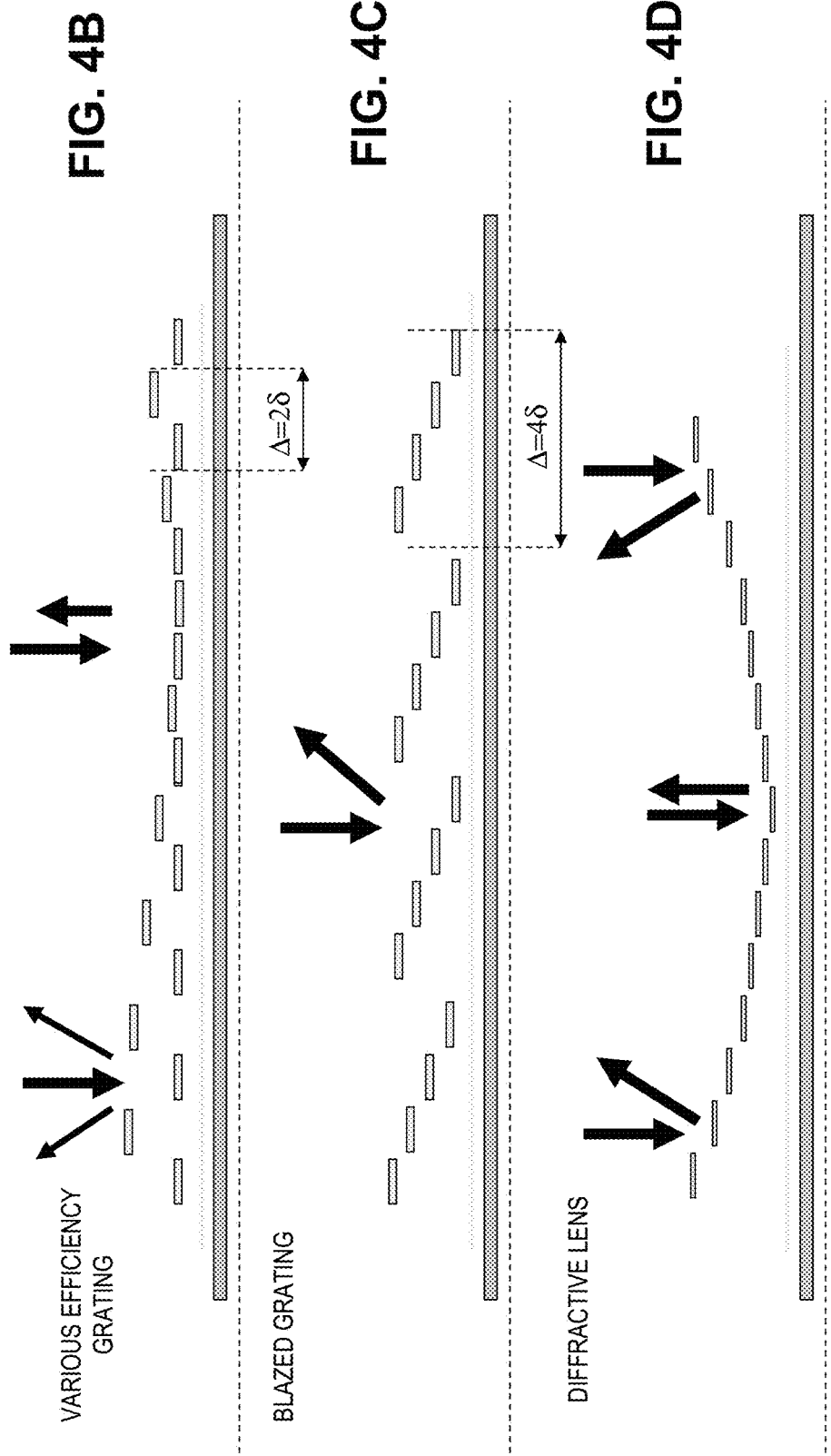
FIGS. 4B-D illustrate example reconfigurable optic configurations that can be utilized in the reconfigurable lens in FIG. 4A, in accordance with an embodiment of the disclosure.

FIGS. 4B-D illustrates example reconfigurable optic configurations that can be utilized in reconfigurable lens 433 in FIG. 4A, in accordance with an embodiment of the disclosure. More specifically, FIGS. 4B-D illustrates reconfigurable reflective lenses that can be integrated into deformable lenses or micro-electro-mechanical systems. FIG. 4B shows a various efficiency grating, FIG. 4C shows a blazed grating, and FIG. 4D shows a diffractive lens. In FIGS. 4B and 4C, Λ represents the grating period produced by the dynamic element(s) of the reconfigurable reflective lens and δ represents the size of a single element of the reconfigurable reflective lens. Switchable diffractive lenses can be sourced from Holo-eye of Germany and from Light Blue Optics of the United Kingdom. In these reconfigurable lenses, the off-axis and the focal length can be tuned arbitrarily (via lens configuration signal 451) in real time.

Figure 5:
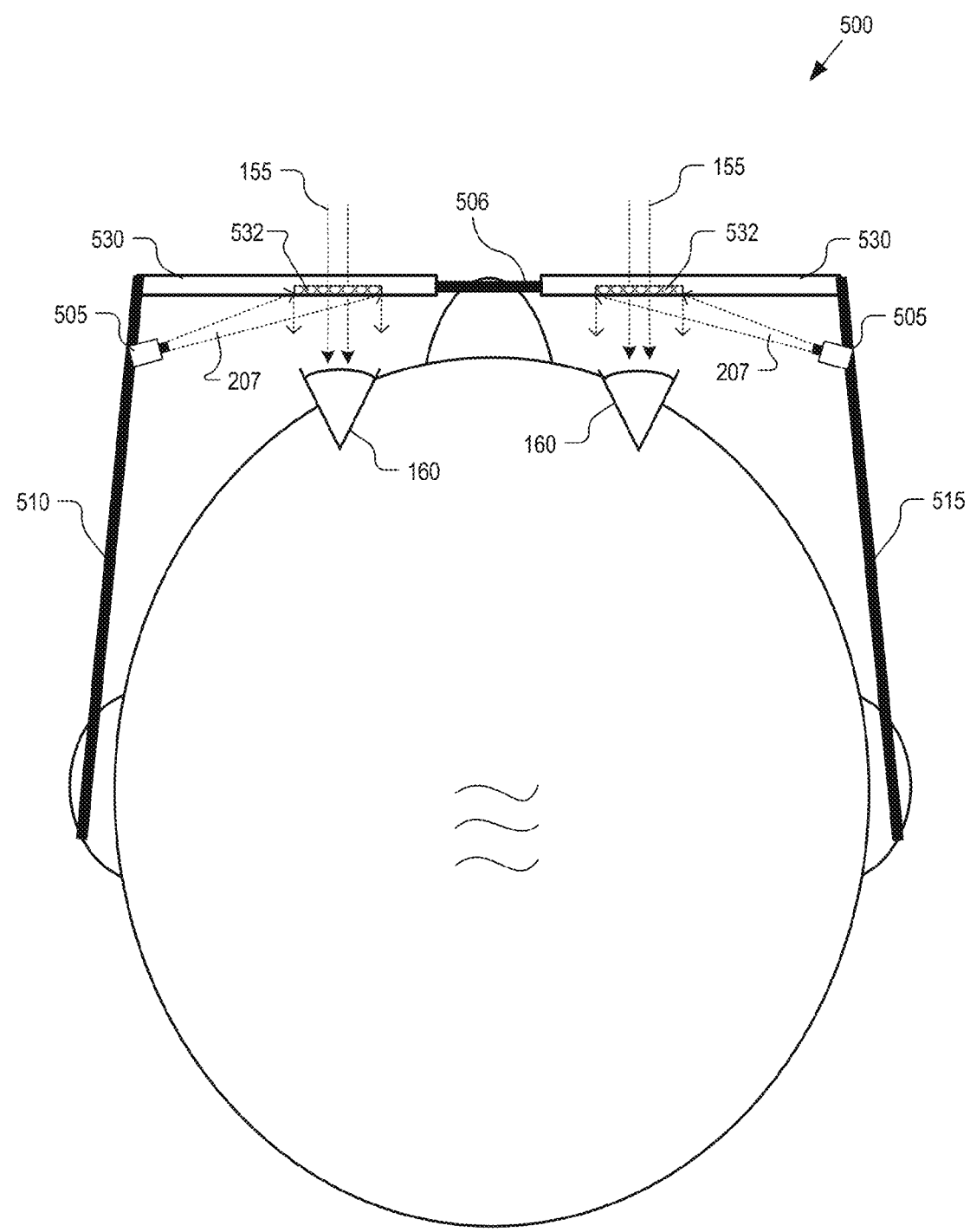
FIG. 5 depicts a top view of a user wearing a binocular head mounted display that includes a dynamic lens, in accordance with an embodiment of the disclosure.

FIG. 5 depicts a top view of a user wearing a binocular head mounted display that includes a dynamic lens, in accordance with an embodiment of the disclosure. Each optical combiner 530 may be implemented with an embodiment of optical combiners 230, 330, or 430. Element 532 may be a reflective element 235 or reconfigurable lens 433, depending on the embodiment that is utilized. Although not illustrated, tunable lens 233 or stacked switchable lens 340 may be disposed between element 532 (which would be reflective element 235) to achieve the embodiments of FIGS. 2A and 3A, respectively. Display module 505 may be implemented with display modules 205/305/405.

Optical combiners 530 are mounted to a frame assembly, which includes a nose bridge 506, left ear arm 510, and right ear arm 515. Although FIG. 5 illustrates a binocular embodiment, HMD 500 may also be implemented as a monocular HMD. The two optical combiners 530 are secured into an eye glass arrangement that can be worn on the head of a user. The left and right ear arms 510 and 515 rest over the user's ears while nose bridge 506 rests over the user's nose. The frame assembly is shaped and sized to position each optical combiner 530 in front of a corresponding eye 160 of the user. Of course, other frame assemblies having other shapes may be used (e.g., a visor with ear arms and a nose bridge support, a single contiguous headset member, a headband, goggles type eyewear, etc.).

The illustrated embodiment of HMD 500 is capable of displaying an augmented reality to the user. Each optical combiner 530 permits the user to see a real world image via external scene light 155. Left and right (binocular embodiment) image light 207 may be generated by display modules 505 mounted to left and right ear arms 510 and 515. Image light 207 (after being reflected by element 532) is seen by the user as a virtual image superimposed over the real world as an augmented reality.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A Head Mounted Display ("HMD") comprising:
a display module to generate image light;
an optical combiner for combining the image light with external scene light, wherein the optical combiner includes a reflective element coupled to receive the image light and to direct the image light towards an eyeward region;
a tunable lens positioned to receive the image light and configured to adjust a focal length of the tunable lens to focus the image light at varying focus depths; and
control circuitry configured to output a focus signal to control adjusting the focal length of the tunable lens, to control the display module to include at least a first image and a second image in the image light, and to select a first focal length of the tunable lens when the first image is included in the image light and a second focal length of the tunable lens when the second image is included in the image light, the first focal length being different from the second focal length,
wherein the control circuitry is configured to control the display module to display the first image with the tunable lens at the first focal length during a first time period, display no image as the tunable lens is adjusted from the first focal length to the second focal length during a second time period, and display the second image with the tunable lens at the second focal length during a third time period, and wherein the control circuitry is configured to control the display module to display the first image and the second image towards the eyeward region and to superimpose the first image on the second image.

2. The HMD of claim 1, wherein the display of the first image during the first time period and the display of the second image during the third time period are interlaced in the image light at a frequency high enough to be imperceptible to a human eye.

3. The HMD of claim 1, wherein the control circuitry is configured to control the display module to include a third image in the image light, and wherein the control circuitry is configured to select a third focal length of the tunable lens when the third image is included in the image light, the third focal length different from the first and the second focal lengths.

4. The HMD of claim 1, wherein the tunable lens is disposed between the display module and the reflective element.

5. The HMD of claim 1, wherein the tunable lens includes primary liquid crystals disposed between two electrodes and the primary liquid crystals are configured to change orientation in response to the focus signal received from the control circuitry, and wherein changing the orientation of the primary liquid crystals adjusts the focal length of the tunable lens.

6. The HMD of claim 5, wherein the tunable lens includes a receiving side opposite an exiting side, wherein the image light propagates through the receiving side to the exiting side of the tunable lens, wherein the receiving side is parallel to the exiting side, and wherein a first one of the two electrodes is curved and is disposed between the receiving side and the exiting side.

7. The HMD of claim 6, wherein a second one of the two electrodes is disposed proximate to the receiving side and is disposed between the receiving side and the first one of the two electrodes, and wherein the tunable lens includes secondary liquid crystals disposed between the first one of the two electrodes and the exiting side.

8. The HMD of claim 5, wherein the tunable lens includes a receiving side opposite an exiting side, wherein the image light propagates through the receiving side to the exiting side of the tunable lens, wherein a first one of the two electrodes is flat and is disposed proximate to the receiving side, and wherein a second one of the two electrodes is curved and is disposed proximate to the exiting side.

9. The HMD of claim 1, wherein the tunable lens includes a tunable liquid lens that changes electrostatic pressure of the tunable lens in response to the focus signal received from the control circuitry, wherein changing the electrostatic pressure adjusts the focal length of the tunable lens.

10. The HMD of claim 1, wherein the control circuitry is configured to control the display module to interlace the display of the first image and the second image to form a combined image that is perceived to have depth when viewed from the eyeward region.

* * * * *